United States Patent
Aubrion et al.

(10) Patent No.: US 11,795,920 B2
(45) Date of Patent: Oct. 24, 2023

(54) LIGHTNING PROTECTION FOR A WIND TURBINE BLADE

(71) Applicant: LM WIND POWER A/S, Kolding (DK)

(72) Inventors: Mathilde Aubrion, Kolding (DK); Boas Eiriksson, Kolding (DK)

(73) Assignee: LM WIND POWER A/S, Kolding (DK)

( * ) Notice: Subject to any disclaimer, the term of this patent is extended or adjusted under 35 U.S.C. 154(b) by 175 days.

(21) Appl. No.: 17/276,554

(22) PCT Filed: Oct. 24, 2019

(86) PCT No.: PCT/EP2019/079028
§ 371 (c)(1),
(2) Date: Mar. 16, 2021

(87) PCT Pub. No.: WO2020/084052
PCT Pub. Date: Apr. 30, 2020

(65) Prior Publication Data
US 2022/0034305 A1 Feb. 3, 2022

(30) Foreign Application Priority Data
Oct. 25, 2018 (EP) .................................. 18202663

(51) Int. Cl.
*F03D 80/30* (2016.01)
*F03D 1/06* (2006.01)

(52) U.S. Cl.
CPC ........... *F03D 80/30* (2016.05); *F03D 1/0675* (2013.01); *F03D 1/0677* (2023.08);
(Continued)

(58) Field of Classification Search
CPC ... F03D 80/30; F03D 1/0675; F05B 2240/302
See application file for complete search history.

(56) References Cited

U.S. PATENT DOCUMENTS

| | | | |
|---|---|---|---|
| 7,040,864 B2* | 5/2006 | Johansen | H02G 13/00 416/146 R |
| 8,096,765 B2* | 1/2012 | Fritz | F03D 1/0675 416/62 |

(Continued)

FOREIGN PATENT DOCUMENTS

| | | | | |
|---|---|---|---|---|
| EP | 1950414 A2 | 7/2008 | | |
| EP | 2019204 A1 * | 1/2009 | ........... | F03D 1/0675 |

(Continued)

OTHER PUBLICATIONS

English translation of JP2005351204A (Year: 2005).*
European Search Report dated Apr. 12, 2019 corresponding to application No. 18202663.3-1007.

*Primary Examiner* — Igor Kershteyn
*Assistant Examiner* — Wesley Le Fisher
(74) *Attorney, Agent, or Firm* — Nath, Goldberg & Meyer; Jerald L. Meyer; Tanya E. Harkins

(57) ABSTRACT

Disclosed is a wind turbine blade comprising a first blade section and a second blade section connected to the first blade section. The wind turbine blade comprises a first down conductor for conducting lightning current to ground. The blade further comprises one or more lightning receptors at or in proximity of an external surface of the wind turbine blade. A smallest distance from a first lightning receptor of the one or more lightning receptors to an interface between the first blade section and the second blade section may be less than or equal to a chord length of a chord of the wind turbine blade at the interface between the first blade section and the second blade section.

36 Claims, 11 Drawing Sheets

(52) U.S. Cl.
CPC ...... *F03D 80/301* (2023.08); *F05B 2240/302* (2013.01); *F05B 2240/307* (2020.08)

(56) References Cited

U.S. PATENT DOCUMENTS

| | | | | |
|---|---|---|---|---|
| 8,142,157 | B2* | 3/2012 | Kita | F03D 80/00 416/224 |
| 8,562,296 | B2* | 10/2013 | Arocena De La Rua | F03D 80/30 416/232 |
| 8,939,726 | B2* | 1/2015 | Grabau | F03D 1/0675 415/908 |
| 9,041,410 | B2* | 5/2015 | Hansen | F03D 80/30 324/525 |
| 10,563,636 | B2* | 2/2020 | Yarbrough | F03D 1/0675 |
| 10,648,456 | B2* | 5/2020 | Shain | F03D 80/30 |
| 10,760,545 | B2* | 9/2020 | Yarbrough | F03D 1/0675 |
| 10,794,359 | B2* | 10/2020 | Merzhaeuser | B29C 65/5042 |
| 2008/0240925 | A1* | 10/2008 | Kita | F03D 80/30 416/230 |
| 2010/0272570 | A1* | 10/2010 | Arocena De La Rua | F03D 80/30 416/146 R |
| 2010/0329865 | A1* | 12/2010 | Hibbard | F03D 80/30 174/2 |
| 2011/0142671 | A1 | 6/2011 | Fritz et al. | |
| 2012/0243992 | A1* | 9/2012 | Grabau | F03D 80/30 416/23 |
| 2012/0321468 | A1* | 12/2012 | Hansen | F03D 80/30 416/146 R |
| 2018/0112649 | A1* | 4/2018 | Shain | F03D 80/40 |
| 2018/0135602 | A1 | 5/2018 | Tobin et al. | |
| 2018/0223796 | A1* | 8/2018 | Yarbrough | F03D 1/0675 |
| 2018/0274521 | A1* | 9/2018 | Akhtar | F03D 80/30 |
| 2020/0095976 | A1* | 3/2020 | Merzhaeuser | F03D 1/0675 |

FOREIGN PATENT DOCUMENTS

| | | | |
|---|---|---|---|
| EP | 2243955 | B1 | 9/2015 |
| EP | 3299618 | A1 | 3/2018 |
| JP | 2005351204 | A * | 12/2005 |
| JP | 2008-115783 | A | 5/2008 |
| WO | WO-9607825 | A1 * | 3/1996 ............ F03D 80/30 |

* cited by examiner

LIGHTNING PROTECTION FOR A WIND TURBINE BLADE

This is a National Phase Application filed under 35 U.S.C. 371 as a national stage of PCT/EP2019/079028, filed Oct. 24, 2019, an application claiming the benefit of European Application No. 18202663.3, filed Oct. 25, 2018, the content of each of which is hereby incorporated by reference in its entirety.

The present disclosure relates to lightning protection of a wind turbine blade, more specifically the disclosure relates to lightning protection of a wind turbine blade comprising a first blade section and a second blade section, and optionally more blade sections.

BACKGROUND

As wind turbines and wind turbine blades increase in size, the risk of lighting striking the wind turbine increases. It is therefore of increasing interest to provide wind turbines and in particular wind turbine blades with lightning protection measures.

It is known to provide blades for wind turbines with lightning receptors that are inside the blade, in electric connection with a metallic down conductor that is able to conduct a lightning current to earth.

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two mould parts. Afterwards, the two halves are positioned on top of each other, and the two halves are glued together. The blade parts may be positioned on top of each other by turning and repositioning the complete half mould.

As the demand for blades for wind turbines tends towards blades of increasing lengths, a need concurrently arises for manufacture of blades having increased rigidity and a comparatively lower weight. One way of achieving these properties it to combine various types of fibres in the laminate of the blades, for instance it is an option to combine glass fibres and carbon fibres, and likewise carbon fibres or glass fibres may advantageously be combined with steel fibres. Combinations with other types of fibres are thus also possible and it is also an option to exclusively employ carbon fibres or other suitable fibre type. Combination of e.g. glass fibres with carbon fibres in a so-called hybrid laminate may possess a problem in that some of the fibre types are electrically conductive, e.g. carbon fibres and steel fibres.

A lightning strike directly into the laminate may cause damage to a blade comprising electrically conductive fibres and non-conductive fibres, as the overall resistivity is relatively high, and a lightning strike would cause the conductive fibres would be greatly heated and thereby be weakened. This is also a problem in case of fibres having relatively poor conductivity, such as carbon fibres, and also in hybrid laminates with fibres in e.g. mat-shape, where individual layers may e.g. have a small portion of electrically conductive fibres and a larger portion of e.g. glass fibres that are not electrically conductive.

Further as the demands for blades for wind turbines tends towards blades of increasing lengths, attention is increasing on concepts of manufacturing blades in sections for being assembled at the installation site. Elements provided for allowing a secure and reliable connection between individual sections of the wind turbine blade bring about another challenge to protect the wind turbine blade from damages caused by lightning strikes. Such a wind turbine blade, comprising a plurality of sections, may be known as a split blade, or two-part blade, or segmented blade or similar.

European patent application publication EP 1 950 414 A2, a substantial amount of metallic material is located in the actual shell wall of the blade and even crosses the interface between two blade parts. This substantially increases the risk of lightning striking at the interface between blade sections.

In European patent application publication EP 2 243 955 A2, the shell wall is entirely metallic at the interface between two blade sections. A metal fairing covers blade connector elements spanning from one blade section to the other. This has the same disadvantages as described in relation to EP 1 950 414 A2 above, such as attracting lightning where it is of vital importance to avoid lightning strikes.

In European patent application publication EP 1 950 414 A2 and European patent application publication EP 2 243 955 A2 the lightning conductors all participate in resiliently holding the two blade sections together. Such a construction makes the blades more susceptible to being damaged by lightning.

SUMMARY

It is an object of the present disclosure to provide lightning protection for a wind turbine blade, such as a split or segmented blade, where the wind turbine blade is manufactured by manufacturing two (or more) blade sections and then joining them. This also makes transporting the wind turbine blade easier. In particular, it is an objective of the present disclosure to reduce or eliminate the risk of lightning striking particularly vulnerable parts of the wind turbine blade.

It is also an object of the present disclosure to provide an alternative wind turbine blade having a reduced risk of being damaged by a lightning strike.

A first aspect of the invention provides a wind turbine blade extending along a longitudinal axis from a root end to a tip end, the wind turbine blade comprising a first blade section extending along the longitudinal axis to a first end, and a second blade section connected to the first blade section, the second blade section extending along the longitudinal axis from a second end towards the tip end, the first blade section comprising a first airfoil region, the second blade section comprising a second airfoil region, the wind turbine blade comprising a first down conductor for conducting lightning current to ground, the blade further comprising one or more lightning receptors at or in proximity of an external surface of the wind turbine blade, a smallest distance from a first lightning receptor of the one or more lightning receptors to the first end of the first blade section being less than or equal to a chord length of a chord of the wind turbine blade at the first end, the first lightning receptor being in electrical connection with the first down conductor.

The chord of the wind turbine blade may be a straight line between a leading edge and a trailing edge of the wind turbine blade.

In some embodiments, the first blade section extends from a root end to the first end. In some embodiments, the second blade section extends from the second end to the tip end. In some embodiments, the wind turbine blade comprises a first blade section extending along a longitudinal axis from a root end to a first end, and a second blade section connected to the first blade section, the second blade section extending along the longitudinal axis from a second end to a tip end, the first blade section comprising a root region and a first airfoil region, the second blade section comprising a second airfoil region and the tip end, the wind turbine blade comprising a first down conductor for conducting lightning current to ground, the blade further comprising one or more lightning receptors at or in proximity of an external surface of the wind turbine blade, a smallest distance from a first lightning receptor of the one or more lightning receptors to the first end of the first blade section being less than or equal to a chord length of a chord of the wind turbine blade at the first end, the first lightning receptor being in electrical connection with the first down conductor.

The one or more lightning receptors preferably comprise a conductive material, such as carbon fibre reinforced polymer or metal, such as steel or copper or aluminium or other metal or alloy. The larger the portion of conductive metal in the lightning receptors, the more efficient the lightning receptors will be at attracting lightning.

In many cases, a length of a circumference of the blade is approximately twice the chord length at the same position. Thus, alternatively to a chord length, the smallest distance from said first lightning receptor of the one or more lightning receptors to the first end of the first blade section is less than half a length of a circumference at the first end of the first blade section.

In some embodiments, the smallest distance from the first lightning receptor to the first end of the first blade section is less than half of the chord length at the first end, such as less than a third of said chord length, such as less than a fourth of said chord length.

In some embodiments, a smallest distance between the first lightning receptor and the first end is less than 5 m, such as less than 4 m, such as less than 3 m, such as less than 2 m, such as less than 1 m, such as less than 50 cm, such as less than 10 cm.

In some embodiments, the first lightning receptor is positioned in the first blade section, such as in the first airfoil region. In some embodiments, the first lightning receptor is positioned in the second blade section, such as in the second airfoil region.

In some embodiments, the first blade section comprises the first lightning receptor, and the second blade section comprises a second lightning receptor.

In some embodiments, the second lightning receptor is in electrical connection with the first down conductor. In some embodiments, the second lightning receptor is in electrical connection with a second down conductor.

In some embodiments, a smallest distance between the second lightning receptor and the second end of the second blade section is less than or equal to a chord length of a chord of the wind turbine blade at the second end, such as less than a half of the chord length at the second end.

The smallest distance between the second lightning receptor and the second end of the second blade section may be less than 1 m, such as less than 50 cm, such as less than 10 cm.

In some embodiments, a smallest distance between the first lightning receptor and the first end of the first blade section is equal to or substantially equal to a smallest distance between the second lighting receptor and the second end of the second blade section. For instance, in some embodiments, the smallest distance between the first lightning receptor and the first end of the first blade is between 20% shorter and 20% longer than the smallest distance between the second lightning receptor and the second end of the second blade. In some embodiments, the smallest distance between the first lightning receptor and the first end of the first blade is between 10% shorter and 10% longer than the smallest distance between the second lightning receptor and the second end of the second blade. In some embodiments, the smallest distance between the first lightning receptor and the first end of the first blade is between 5% shorter and 5% longer than the smallest distance between the second lightning receptor and the second end of the second blade.

A smallest distance between the first lightning receptor and the second lightning receptor may, as an example, be less than two times the chord length at the first end, such as less than the chord length at the first end.

In some embodiments, a smallest distance between the first lightning receptor and the second lightning receptor is less than 5 m, such as less than 4 m, such as less than 3, such as less than 2 m, such as less than 2 m, such as less than 1 m, such as less than 50 cm.

In some embodiments, the one or more lightning receptors comprises a tip lightning receptor positioned in the second blade section at or in proximity of the tip end, the tip lightning conductor being in electrical connection with a down conductor for conducting lightning current to ground. In some embodiments, a smallest distance between the tip lightning receptor and the tip end is less than 5 m, such as less than 3 m, such as less than 2 m, such as less than 1 m, such as less than 20 cm.

In some embodiments, the one or more lightning receptors comprises a lightning receptor positioned between the first lightning receptor and the root end.

In some embodiments, the first blade section is connected to the second blade section by a spar beam. In some embodiments, the first blade section comprises a spar beam holding element and the second blade section comprises the spar beam, and the spar beam is held in place at the spar beam holding element at least by one or more fastening elements, each fastening element rigidly attaching a respective part of the spar beam holding element to a respective part of the spar beam. In some embodiments, the second blade section comprises the spar beam holding element and the first blade section comprises the spar beam, and the spar beam is held in place at the spar beam holding element at least by one or more fastening elements, each fastening element rigidly attaching a respective part of the spar beam holding element to a respective part of the spar beam.

In some embodiments, a first fastening element of the one or more fastening elements is a pin extending at least partly through the spar beam holding element and the spar beam.

In some embodiments, at least one of the one or more fastening elements is positioned at a longitudinal position, with respect to the longitudinal axis, between a longitudinal position of the first lightning receptor and a longitudinal position of the first end, or at substantially the same longitudinal position as the first lightning receptor. In some embodiments, an element, such as one of the one or more fastening elements, may be arbitrarily positioned along an axis transverse to the longitudinal axis. The axis transverse to the longitudinal axis is in some cases simply identical to an axis defined by a chord of the wind turbine blade, for instance a chord at a position of one of the one or more fastening elements or a chord at a position of the first lightning receptor or a chord at the first end of the first blade section. Thus, from another point of view, the longitudinal axis may be perpendicular to a chord axis defined by the chord of the blade. The longitudinal axis may be operable as a Z axis, the chord axis may be operable as an X axis and height axis, i.e. being perpendicular to the longitudinal axis and the chord axis may be a Y axis. Accordingly, in an alternative formulation, at least one of the one or more fastening elements has a Z coordinate which is between a Z coordinate of the first lightning receptor and a Z coordinate of the first end, or at least one of the one or more fastening elements has a Z coordinate equal to or substantially equal to a Z coordinate of the first lightning receptor.

In some embodiments, at least one of the one or more lightning receptors is located at a longitudinal position, with respect to the longitudinal axis, with a longitudinal distance of less than 1 m from a longitudinal position of an end of the spar beam. In some embodiments, a smallest distance between an end of the spar beam and one of the one or more lightning receptors is less than 5 m, such as less than 2 m, such as less than 1 m.

The wind turbine blade may for instance be a split blade, a two-part blade, or segmented blade.

In some embodiments, the first down conductor is configured to conduct lightning current to ground. In some embodiments, the first down conductor is configurable for conducting lightning current to ground.

In some embodiments, the second down conductor may be configured for conducting lightning current to ground, for instance via the first down conductor, or by a current path to ground or at least to the root region of the wind turbine blade, e.g. separate from a current path to ground of the first down conductor.

In some embodiments, a first side of the wind turbine blade and a second side of the wind turbine blade each comprises one or more lightning receptors. For instance, a blade pressure side of the wind turbine blade may comprise one or more lightning receptors, and a blade suction side of the wind turbine blade may comprise one or more lightning receptors. To attract lightning, the lightning receptors are electrically connected to one or more down conductors, for instance as described above.

The closer the first lightning receptor and/or the second lightning receptor is to the first end and/or the second end, the more likely is it that the first lightning receptor will attract lightning that otherwise might strike at an interface between the first blade section and the second blade section.

The first lightning receptor may be positioned in contact with both the first blade section and the second blade section, thus extending from the first blade section to the second blade section.

Generally, each lightning receptor may be electrically connected to a corresponding down conductor, two or more lightning receptors may share a same down conductor, or all lightning receptors may be electrically connected to a common down conductor, e.g. the first down conductor.

The spar beam may be positioned such that the first beam position is located in the first airfoil region and the second beam position is located in the second airfoil region. The spar beam may for instance comprise carbon fibres, such as carbon fibre elements, e.g. with a fibre volume ratio of more than 40%, such as more than 50%, such as more than 60%. For example, the spar beam may comprise pultruded carbon-fibre reinforced elements. The spar beam may comprise one or more pultruded fibre reinforced elements, such as a first pultruded fibre reinforced element and/or a second pultruded fibre reinforced element. One of the one or more pultruded fibre reinforced elements, such as the first pultruded fibre reinforced element and/or the second pultruded fibre reinforced element may be a pultruded carbon-fibre reinforced element.

The spar beam may also or alternatively comprise glass fibres.

A cross-section of the spar beam may for instance be rectangular, circular, oval, or have a combination of straight and curved sides.

The wind turbine blade may be manufactured by joining a first shell part to a second shell part to form a substantially closed shell of the wind turbine blade (typically being open at the root end).

The wind turbine blade may have a suction side and a pressure side. For instance, the first shell part may form the pressure side of the wind turbine blade, and the second shell part may form the suction side of the wind turbine blade.

The shell, such as the first shell part and/or the second shell part, may comprise one or more spar caps, such as a first spar cap and/or a second spar cap. A spar cap, such as the first spar cap and/or the second spar cap, may be a fibre-reinforced principal laminate. A spar cap, such as the first spar cap and/or the second spar cap, may comprise electrically conductive fibres, such as carbon fibres.

In some embodiments, said smallest distance from the first lightning receptor to the first end of the first blade section is within 15-75 cm.

In some embodiments, a total number of lightning receptors having a smallest distance to the first end of the first blade section equal to or less than said chord length is equal to or less than four. In some embodiments, the total number is allowed to be up to eight, i.e. is at most eight. The one or more receptors within chord length distance of the first end of the first blade section may be distributed in various ways, such as distributed between both the first blade section and the second blade section, evenly or unevenly, or be entirely in the first blade section or entirely in the second blade section; the receptors may be entirely on the pressure side or entirely on the suction side, or distributed between the pressure side and the suction side, evenly or unevenly. In some embodiments, the pressure side of the first blade section and the second blade section comprises at most two of said total number of lightning receptors, or at most four in case of a total number of at most eight. In some embodiments, the suction side of the first blade section and the second blade section comprises at most two of said total number of lightning receptors or at most four in case of a total number of at most eight. In some embodiments, the pressure side of the first blade section and the second blade section comprises at most two of said total number of lightning receptors, such as at most one of said total number of lightning receptors (either in the first blade section or in the second blade section). In some embodiments, the suction side of the first blade section and the second blade section comprises at most two of said total number of lightning receptors, such as at most one of said total number of lightning receptors (either in the first blade section or in the second blade section). In some embodiments, the suction side of the first blade section and the second blade section comprises exactly two of said total number of lightning receptors. In some embodiments, the pressure side of the first blade section and the second blade section comprises exactly two of said total number of lightning receptors. In some embodiments, the suction side of the first blade section and the second blade section comprises exactly two of said total number of lightning receptors, and the pressure side of the first blade section and the second blade section comprises exactly two of said total number of lightning receptors. In some embodiments, all of said total number of lightning receptors have a smallest distance from the first end of the first blade section that is at equal to or less than the chord length, CL.

In some embodiments, a total area of surfaces of the one or more lightning receptors at or in proximity of the external surface of the wind turbine blade is at most equal to 0.1 times the square of the chord length. In some embodiments, this is only required for receptors that have a smallest distance from the first end of the first blade section equal to or less than the chord length. In other words, a total area of surfaces of lightning receptors having a smallest distance to the first end of the first blade section equal to or less than the chord length and being located at or in proximity of the external surface of the wind turbine blade is at most equal to 0.1 times the square of the chord length. In some embodiments, the total area may is at most 0.05 times the square of said chord length, such as at most 0.02 times the square of the chord length.

In some embodiments, said external surface of the wind turbine blade at an interface between the first blade section and the second blade section is non-metallic. It may for instance comprise a fibre-reinforced material based for instance on glass fibres or carbon fibres or a combination thereof.

In some embodiments, at least one of the one or more lightning receptors does not abut the first end of the first blade section. In some embodiments, no lightning receptor that has a smallest distance from the first end of the first blade section of at most the chord length abut the first end of the first blade section.

In some embodiments, the first blade section comprises a first blade shell having a first shell wall defining a contour of the first blade section, and the second blade section comprises a second blade shell having a second shell wall defining a contour of the second blade section.

In some embodiments, at least one of the one or more lightning receptors is integrated into the first shell wall or the second shell wall. For instance, it is arranged in an opening, such as a throughgoing opening, in the first shell wall or the second shell wall. This offsets the receptor from the interface between the first blade section and the second blade section, which improves the structural integrity of the blade and reduces the risk of attracting lightning to the interface as such.

In some embodiments, the one or more lightning receptors is a plurality of lightning receptors, and the first shell wall and/or the second shell wall are configured not to conduct electrical current between at least the first lightning receptor and any of the other lightning receptors of the plurality of lightning receptors. This has the advantage that lightning is attracted only to the receptors, not to the receptors as well as to any electrical connecting means connecting one receptor to another within the shell wall as such.

In some embodiments, at least the first lightning receptor is electrically connected to another of the plurality of lightning receptors only via the first down conductor, and thus via the shell walls. In some embodiments, no two lightning receptors are connected electrically except via the first down conductor and/or another down conductor.

In some embodiments, at least one of the one or more lightning receptors does not participate in maintaining a resilient connection between the first blade section and the second blade section when the wind turbine blade is in operation. This at least partly separates any electrical lightning current from structurally vital components.

In some embodiments, none of the one or more lightning receptors participates in maintaining a resilient connection between the first blade section and the second blade section when the wind turbine blade is in operation. This further separates electrical lightning current from structurally vital components under a lightning strike.

In some embodiments, the connection between the first blade section and the second blade section is a resilient connection provided by connecting means, and at least one of the one or more receptors, such as all of the lightning receptors, is separate from those connecting means.

Although already mentioned in relation to various embodiments, some embodiments described above are susceptible to being combined with the feature that the one or more lightning receptors referred to in those embodiments are arranged such that a smallest distance from any of those one or more lightning receptors to the first end of the first blade section is equal to or less than the chord length CL. In some embodiments, the smallest distance from any of the said one or more lightning receptors to the first end of the first blade section is equal to or less than half of the chord length CL, i.e. at most CL/2.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Unless otherwise indicated, the drawings are not necessarily drawn to scale.

Figure 1:
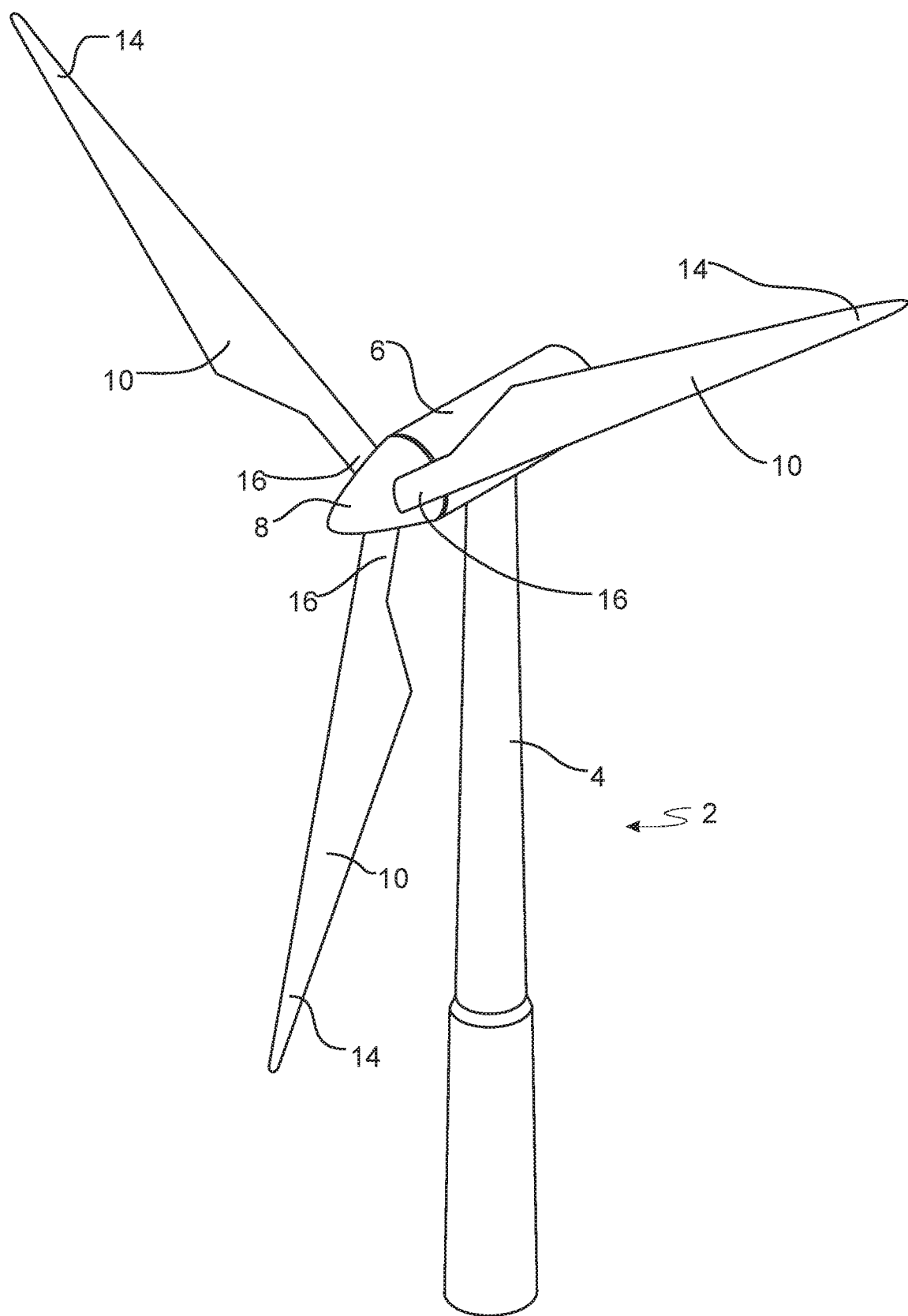
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each blade having a blade root 16 nearest the hub and a blade tip 14 furthest from the hub 8. The invention is not limited to use in wind turbines of this type.

Figure 2:
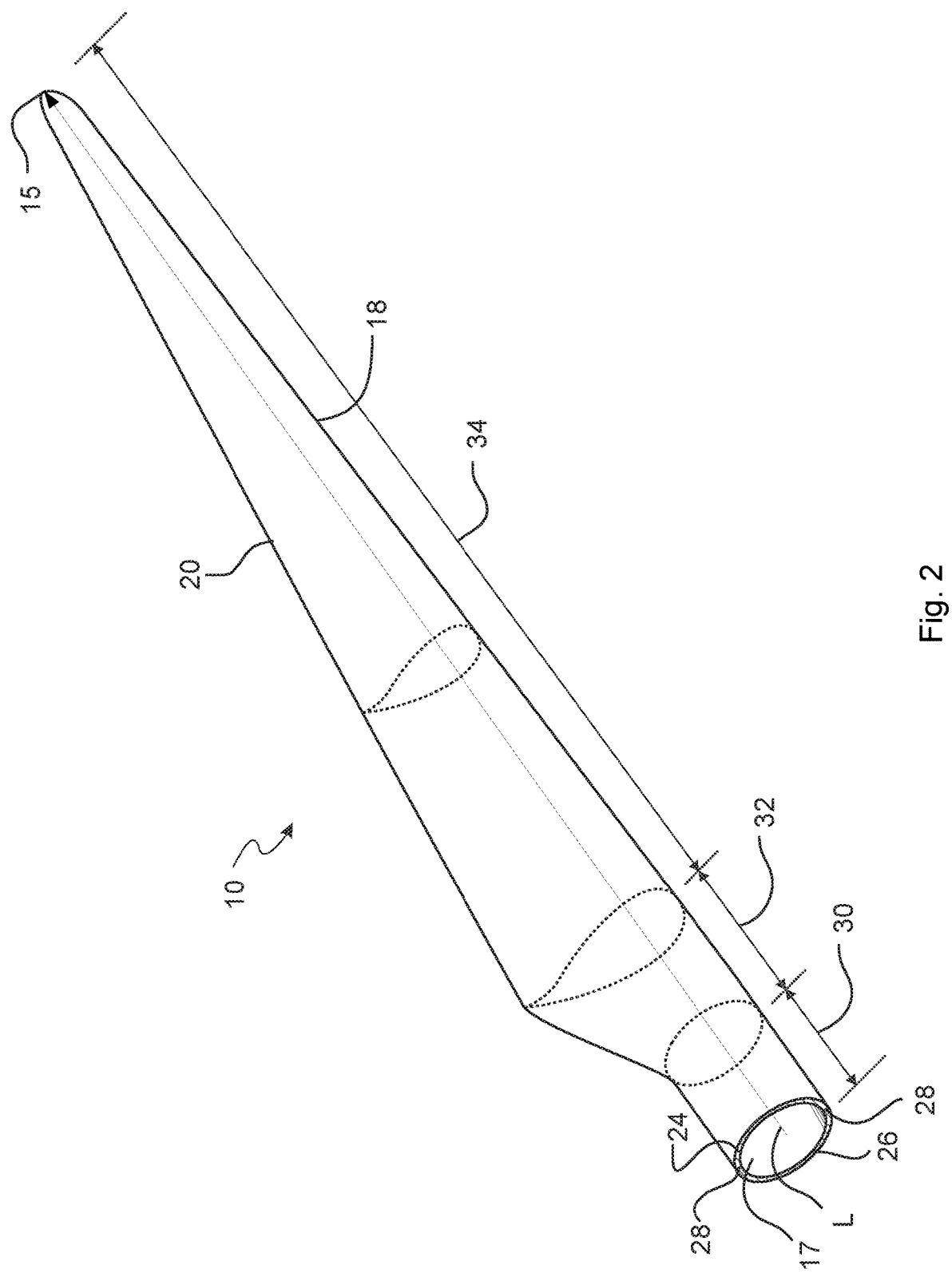
FIG. 2 is a schematic view illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or airfoil region 34, and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) preferably has an ideal or almost ideal blade shape with respect to generating hub rotation, whereas the root region 30 due to structural considerations has a substantially circular or elliptical cross-section, which for instance makes it easier and safer to mount the blade 10 to the hub. The diameter of the root region 30 may be constant along the entire root area 30. The transition region 32 present in the wind turbine blade 10 in this example has a transitional profile gradually changing from the circular shape of the root region 30 to the airfoil profile of the airfoil region 34. The chord length of the transition region 32 typically increases in an outward direction from the hub. The airfoil region 34 has an airfoil profile with a chord extending between the leading edge 18 and the trailing edge 20 of the blade 10.

It should be noted that different sections of the blade normally do not have a common plane, since the blade may be twisted and/or curved (i.e. pre-bent) along a direction from the root region to the tip, this being most often the case, for instance to more or less compensate for the local velocity of the blade being dependent on the distance from the hub.

The wind turbine blade 10 comprises a blade shell which may for instance comprise two blade shell parts, a first blade shell part 24 and a second blade shell part 26, for instance made at least partly of fibre-reinforced polymer. The first blade shell part 24 may for instance be part of a pressure side or upwind blade part. The second blade shell part 26 may for instance be part of a suction side or downwind blade part. The first blade shell part 24 and the second blade shell part 26 are typically joined together, such as glued together, along bond lines or glue joints 28 extending along the trailing edge 20 and the leading edge 18 of the blade 10. Typically, the root ends of the blade shell parts 24, 26 have a semi-circular or semi-oval outer cross-sectional shape that, when the first and second shell parts are joined, form the root region, such as a circular or oval root region.

Figure 3:
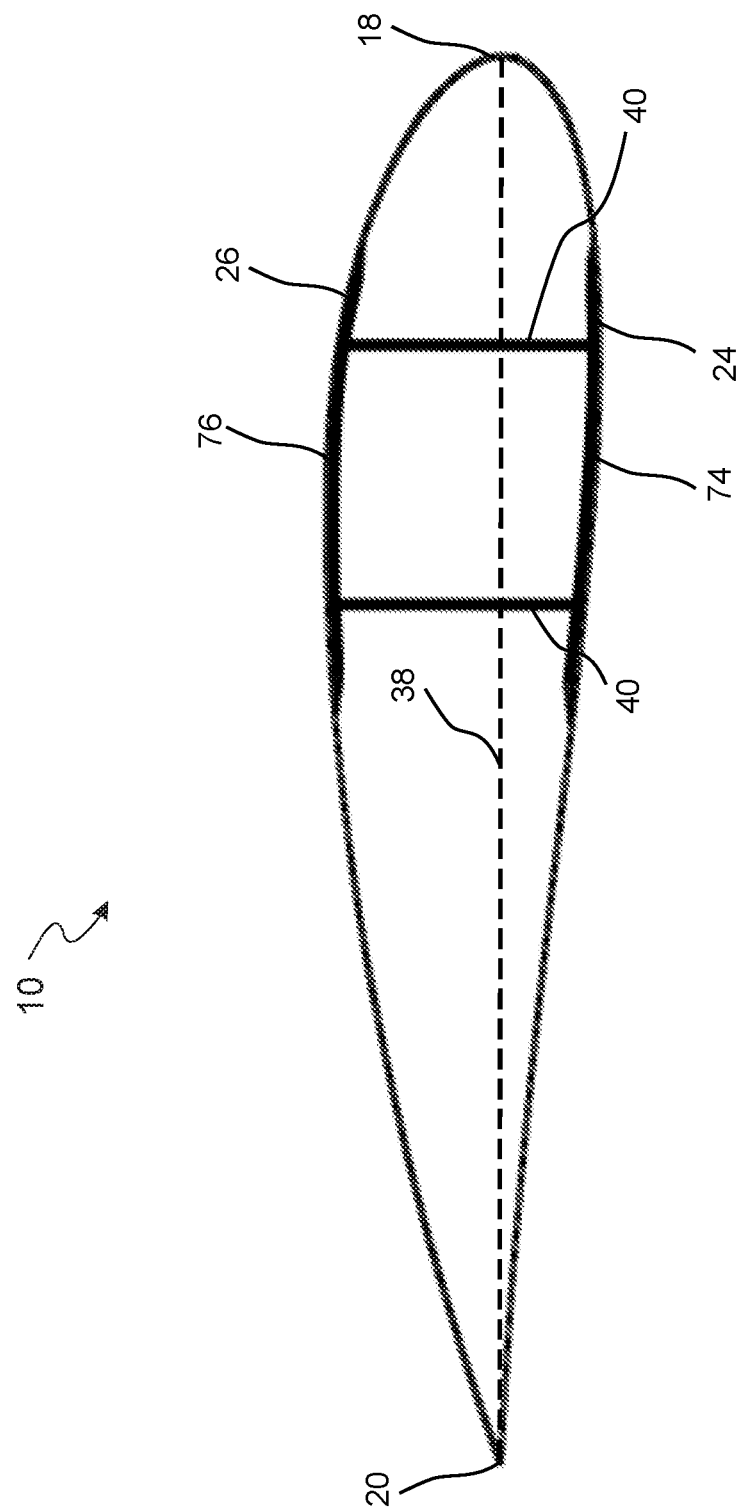
FIG. 3 is a schematic diagram illustrating a cross-section of an exemplary wind turbine blade.

FIG. 3 is a schematic diagram illustrating a cross-sectional view of an exemplary wind turbine blade 10, e.g. a cross-sectional view of the airfoil region of the wind turbine blade 10. The wind turbine blade 10 comprises a leading edge 18, a trailing edge 20, a pressure side 24, a suction side 26, a first spar cap 74, and a second spar cap 76.

The wind turbine blade 10 has a chord 38 (imaginary) between the leading edge 18 and the trailing edge 20.

The wind turbine blade 10 comprises shear webs 40, such as a leading edge shear web and a trailing edge shear web. The shear webs 40 could alternatively, as an example, be a spar box with spar sides, including a trailing edge spar side and a leading edge spar side.

Figure 4:
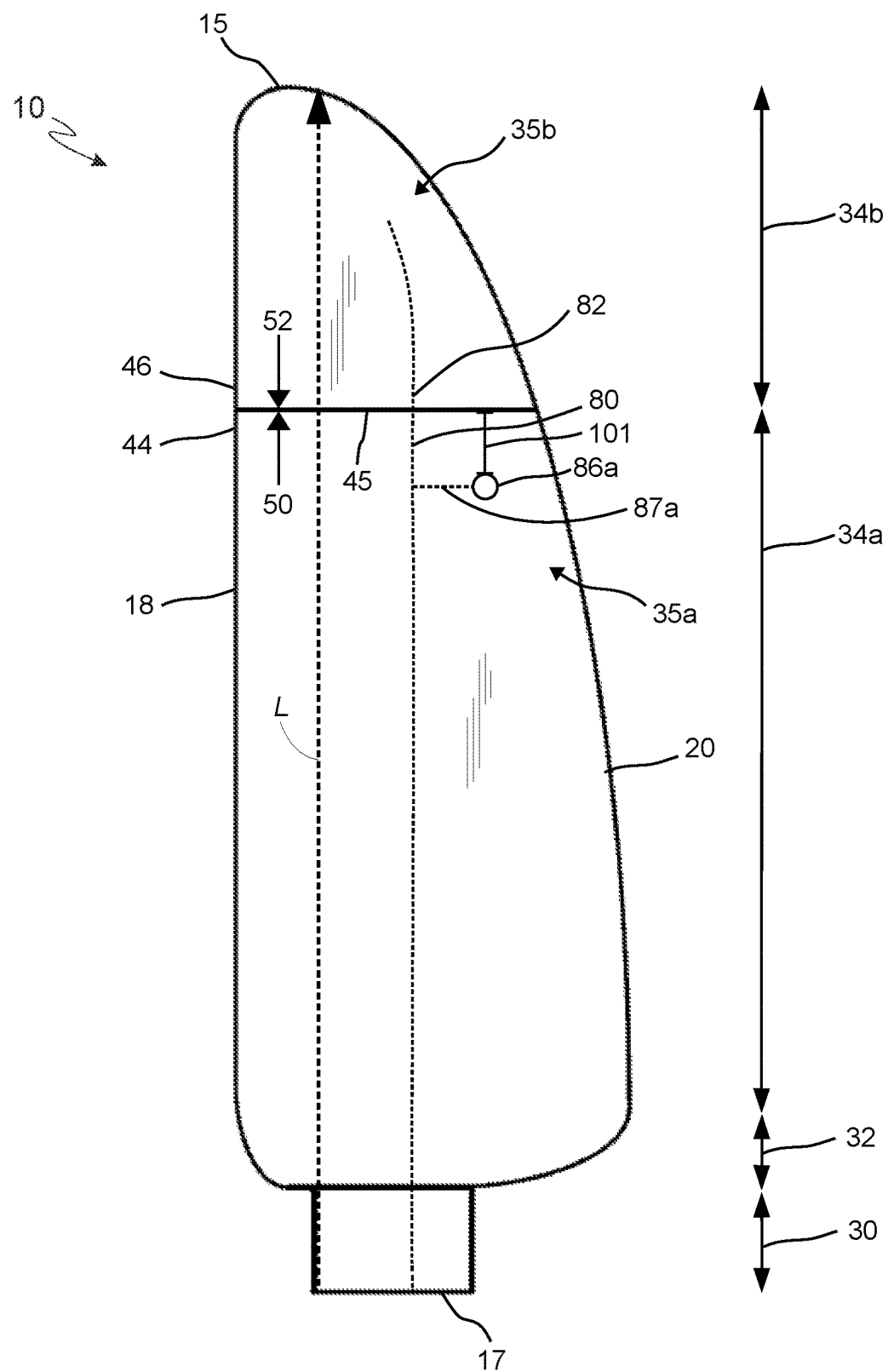
FIG. 4 is a schematic diagram illustrating an exemplary wind turbine blade.

FIG. 4 is a schematic diagram illustrating an exemplary wind turbine blade 10, such as the wind turbine blade 10 substantially as in the previous figures. The wind turbine blade 10 comprises a leading edge 18, a trailing edge 20, a tip end 15, and a root end 17.

The wind turbine blade 10 in FIG. 4 is a so-called split blade, or two-part blade, or segmented blade. The exemplary wind turbine blade 10 comprises a first blade section 44 and a second blade section 46. The first blade section 44 extends along the longitudinal axis L from the root end 17, to a first end 50 of the first blade section 44. The second blade section 46 extends along the longitudinal axis L from a second end 52 to a tip, such as the tip end 15. The first blade section 44 comprises a root region 30, a first airfoil region 34a, and a transition region 32 between the root region 30 and the first airfoil region 34a. The second blade section 46 comprises a second airfoil region 34b with the tip end 15. The first blade section 44 and the second blade section 46 may be mechanically connected for instance with a spar beam.

The inventors have found that the blade interface between the first blade section and the second blade section tends to attract lightning. If lightning strikes at the blade interface, it may cause damage to the blade, e.g. because current may run through blade parts having a relatively low conductivity, which may cause heating of the blade and consequently weakening. Ultimately, this can be a direct cause of blade failure.

It has been found by the inventors that placing a first lightning receptor close to the blade interface can significantly mitigate the problem. Including a second lightning receptor on the opposite blade section to that in which the first lightning receptor is located, may reduce the risk of damage caused by lightning even more.

The lightning receptors attract lightning that might otherwise strike at the blade interface, whereby the damaging effect of lightning striking the blade interface may be avoided or at least reduced.

Accordingly, FIG. 4 illustrates a first lightning receptor 86a arranged in the first airfoil region 34a and exposed to an external surface 35a of the first airfoil region. The first lightning receptor 86a is in electrical contact with a first down conductor 80, for instance via a first lightning receptor connector element 87a, such as an electrical cable or other electrically conducting element, comprising for instance stainless steel and/or copper and/or other conductive material or alloy. As described previously, the first lightning receptor 86a could alternatively be located in the second airfoil region.

The first blade section 44 meets the second blade section at a blade section interface 45. The first lightning receptor is arranged near the blade section interface 45, causing lightning strikes to be attracted by the lightning receptor rather than by the blade section interface. One advantageous arrangement includes positioning the first lightning receptor as close as possible to the blade section interface while maintaining structural integrity and strength by leaving enough blade material around the lightning receptor that the structure in the vicinity of the lightning receptor, for instance a fibre structure, is not weakened.

A smallest distance 101 within 15-75 cm between the first lightning receptor 86a and the blade section interface 45, such as within 25-60 cm, such as within 30-40 cm, such as a smallest distance of 35 cm, has proven to be effective in reducing the risk of lightning striking the blade section interface.

In the example in FIG. 4, the exposed surface of the lightning receptor has a circular shape. A diameter of 15-25 mm, such as 17-20 mm, such as 18.5 mm, may provide good lightning attraction while not adding unnecessary weight and not compromising the strength of the fibre structure of the wind turbine blade in the vicinity of the lightning receptor. Larger diameters, or largest surface dimension in case of non-circular lightning receptors, can be desirable, for instance larger than 25 mm, such as at least 40 mm, such as at least 50 mm, such as at least 100 mm. This dimension may also be chosen based on the local chord length and for instance between 0.01 times the local chord length and 0.5 times the local chord length, such as between 0.02 times the local chord length and 0.25 times the chord length.

Figure 5:
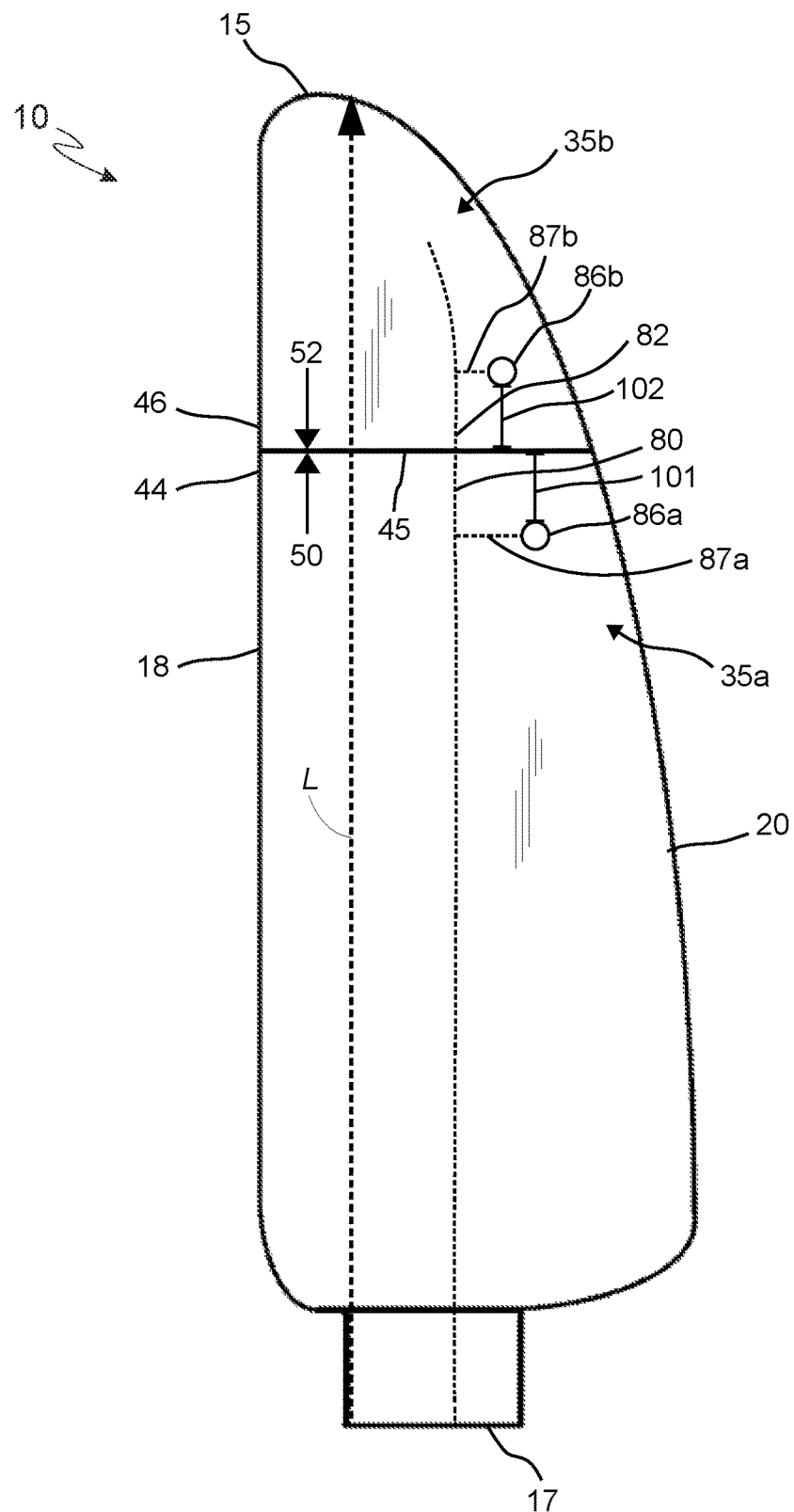
FIG. 5 is a schematic diagram illustrating an exemplary wind turbine blade.

FIG. 5 illustrates a wind turbine blade similar to that in FIG. 4, but with an additional, second lightning receptor 86b arranged in the second airfoil region 34b. The second lightning receptor is exposed to an external surface 35b of the second airfoil region to attract lightning as effectively as possible. The second lightning receptor 86b is in electrical contact with a second down conductor 82, for instance via a second lightning receptor connector element 87b, such as an electrical cable or other electrically conducting element, comprising for instance stainless steel and/or copper and/or other conductive material or alloy. The first and second down conductors 80, 82 and the cables 87a, 87b are arranged inside the blade 10 to protect them from mechanical and/or chemical wear from environmental factors, such as from dust, rain, snow, ice, hail, etc. As mentioned, the lightning receptors 86a and 86b in this example are exposed at the external surfaces 35a, 35b of the first and second airfoil regions 34a, 34b in order to attract lightning as effectively as possible.

A smallest distance 102 between the second lightning receptor 86b and the blade section interface 45 within 15-75 cm, such as within 25-60 cm, such as within 30-40 cm, such as a smallest distance of 35 cm, has proven to be effective in avoiding lightning striking at the blade section interface 45.

A smallest distance between 30 and 150 cm between the first lightning receptor 86a and the second lightning receptor 86b, such as between 50 and 120 cm, such as between 60 and 80 cm, such as 70 cm, has proven to be effective in avoiding lightning striking at the blade section interface 45.

In the example in FIG. 5, the exposed surface of the lightning receptors has a circular shape. diameter of 15-25 mm, such as 17-20 mm, such as 18.5 mm, may provide good lightning attraction while not adding unnecessary weight and not compromising the strength of the fibre structure of the wind turbine blade in the vicinity of the lightning receptor. Larger diameters, or largest surface dimension in case of non-circular lightning receptors, can be desirable, for instance larger than 25 mm, such as at least 40 mm, such as at least 50 mm, such as at least 100 mm. This dimension may also be chosen based on the local chord length and for instance between 0.01 times the local chord length and 0.5 times the local chord length, such as between 0.02 times the local chord length and 0.25 times the chord length.

Figure 6:
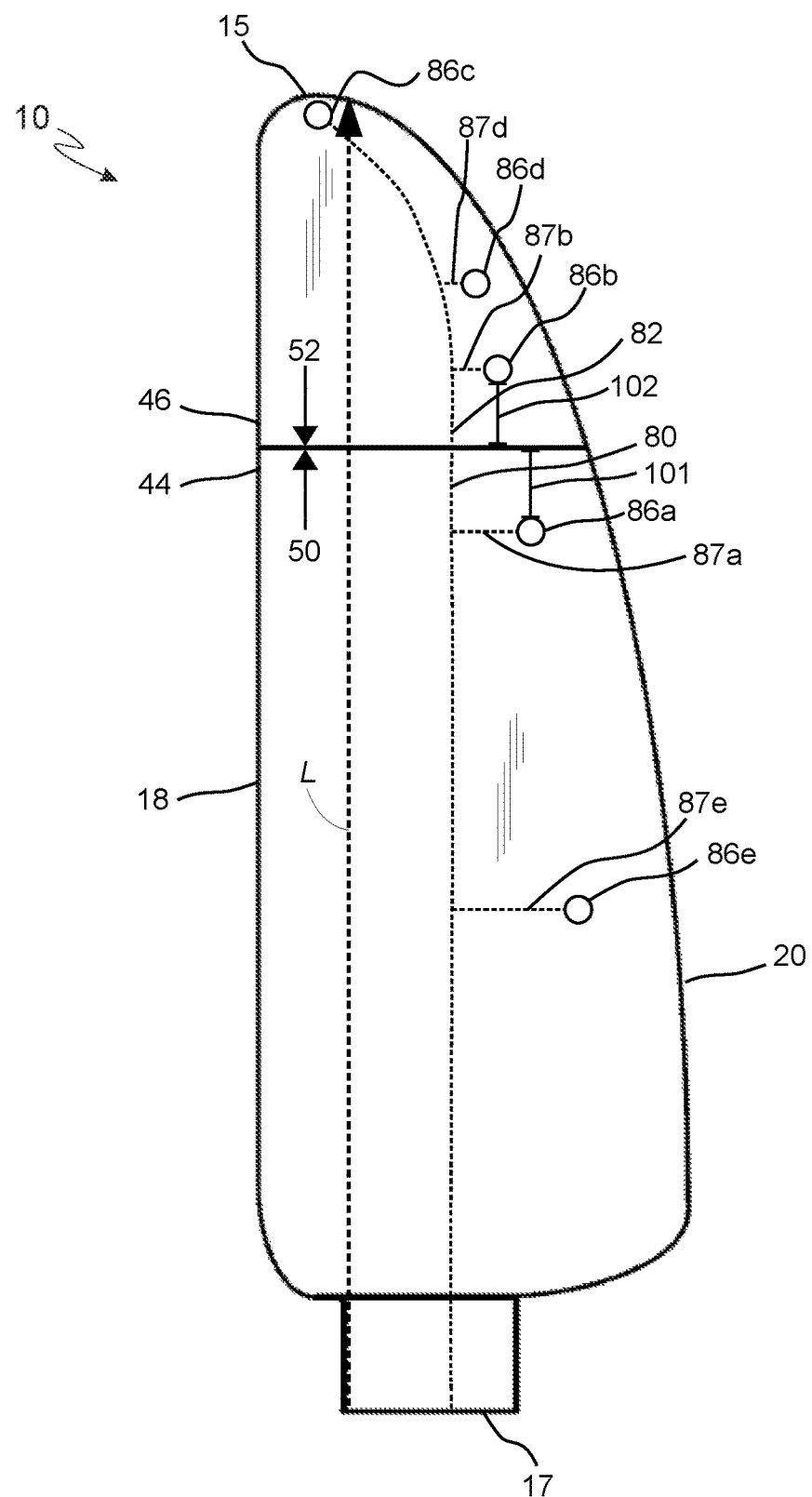
FIG. 6 is a schematic diagram illustrating an exemplary wind turbine blade.

FIG. 6 is a schematic diagram illustrating an exemplary wind turbine blade 10 similar to those in FIGS. 4 and 5, but with additional lightning receptors 86c, 86d, 86e. First and second lightning receptors 86a and 86b provide the same function as described in relation to FIGS. 4 and 5. In FIG. 6, additional lightning receptor 86c is situated near the tip of the blade. The tip 15 is the highest point during one revolution of the hub, and is therefore, all else being equal, more susceptible to being struck by lightning. The tip receptor 86c alleviates the risk of a lightning strike damaging the blade. To conduct current away from the tip, the lightning receptor 86c is connected for instance to the second down conductor 82.

Additional receptors 86d and 86e further attract lightning, decreasing the risk of lightning striking at the blade section interface 45 and/or other non-grounded parts of the blade. Corresponding cables 87d and 87e provide electrical connection of the receptors to the down conductors, in this example to the second down conductor 82 and the first down conductor 80, respectively. In the examples in FIGS. 4-8, the first and second down conductors are one and the same single down conductor.

Figure 7:
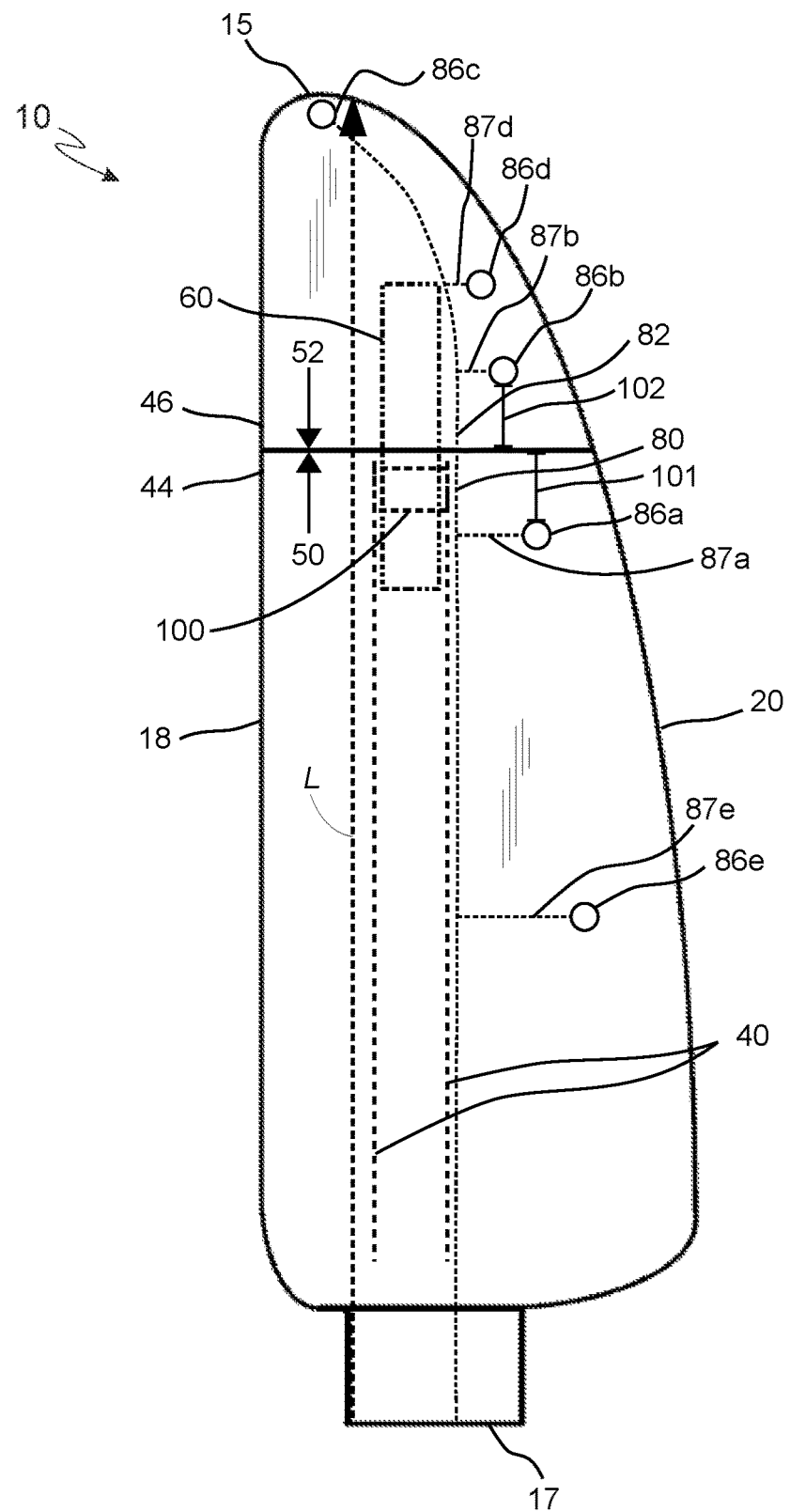
FIG. 7 is a schematic diagram illustrating an exemplary wind turbine blade.

FIG. 7 schematically illustrates a wind turbine blade 10 comprising, as an example, an internal spar beam 60 for connecting the first section 44 to the second blade section 46. FIG. 7 also illustrates parts of a shear web 40 for providing blade strength. The spar beam 60 may be employed with any of the exemplary wind turbine blades 10 as illustrated in FIGS. 4-6.

The spar beam may also be a source of flashover of lightning to internal parts of the wind turbine blade. In some cases, the spar beam may incorporate carbon fibre, and in some cases also conductive metals, such as copper or steel, typically in the form of fibres or a mesh surrounding the spar beam. In this case, arranging a lightning receptor 86d near an end of the spar beam, as illustrated in FIG. 7, may strongly reduce or eliminate the risk of flashover to the spar beam. Similarly, a lightning receptor could be placed at or near the other end of the spar beam.

In this example, the spar beam 60 is built into the second blade section 46 and is rigidly connected to the first blade section via a pin 100. In this construction, the pin may be a source of lightning flashover. Having lightning receptors, such as lightning receptors 86a and/or 86b, in the vicinity of the pin 100, this risk of flashover to the pin is strongly reduced. As illustrated in FIG. 7, the pin is located between the first lightning receptor 86a and the second lightning receptor 86b, at least in between a longitudinal position of the first lightning receptor 86a and a longitudinal position of the second lightning receptor 86b along the longitudinal axis L.

Figure 8:
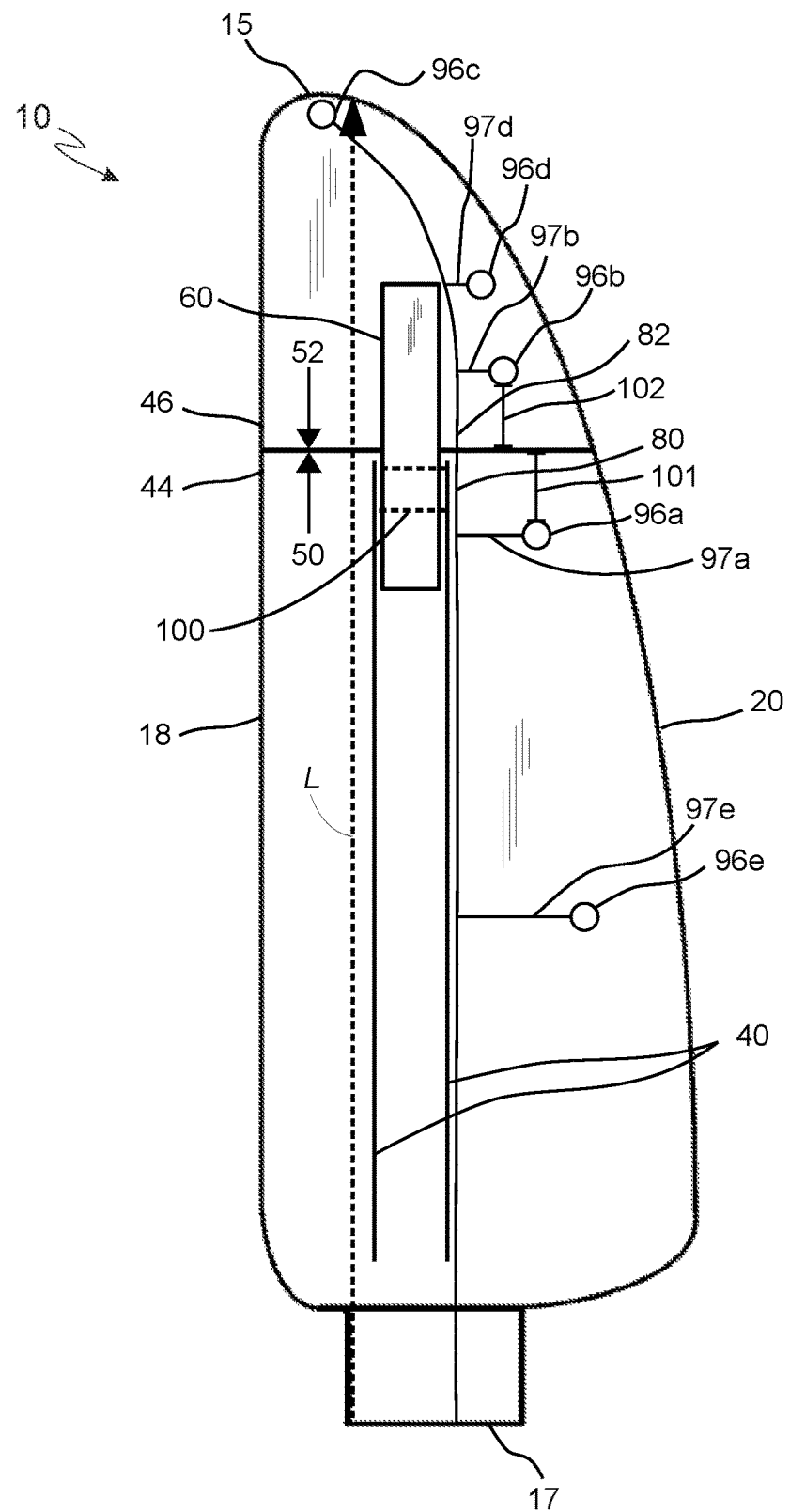
FIG. 8 is a schematic diagram illustrating an internal part of an exemplary wind turbine blade.

FIG. 8 illustrates the blade with the suction side shell part 26 removed to show certain internal parts of the wind turbine blade 10.

The spar beam can be seen with the pin 100 extending through the shear webs and the spar beam, whereby the spar beam is held in place, and consequently the first blade section 44 and the second blade section 46 are held firmly together.

Additionally, FIG. 8 shows lightning receptors 96a-96e placed on the other side of the blade, i.e. in the first shell part 24, to add lightning protection to that side as well. Respective cables 97a-97e provide electrical connections to the down conductors 80, 82, just like the lightning receptors 86a-86e on the blade side shown and described in relation to FIGS. 4-7. The electrical connections to the down conductors 80, 82 may, as an alternative to the respective cables 97a-97e shown, be provided by metal braces, e.g. stainless-steel braces.

Figure 9A:
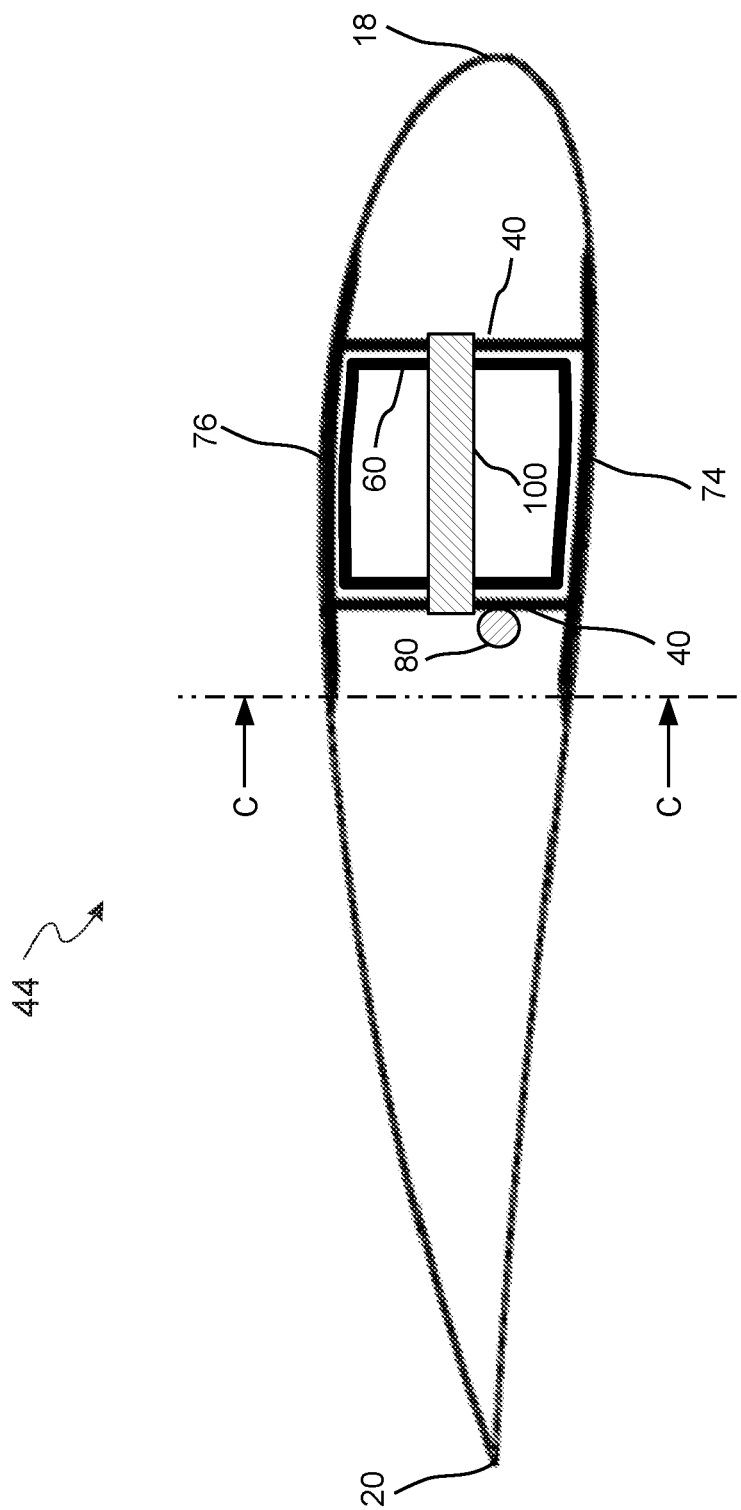
FIG. 9A is a schematic diagram illustrating a cross-section of an exemplary wind turbine blade.

FIG. 9A illustrates a cross-section in the first blade section 44 of the wind turbine blade. The shear web 40 and the spar beam 60 are mechanically connected by the pin 100 extending through the first blade section 44 in a substantially transverse direction relative to the longitudinal axis. More particularly, FIG. 9A shows a cross-section through the middle of the pin 100 to illustrate how the pin holds the first and section blade sections firmly together by extending through both the shear webs 40 and the spar beam 60.

Figure 9B:
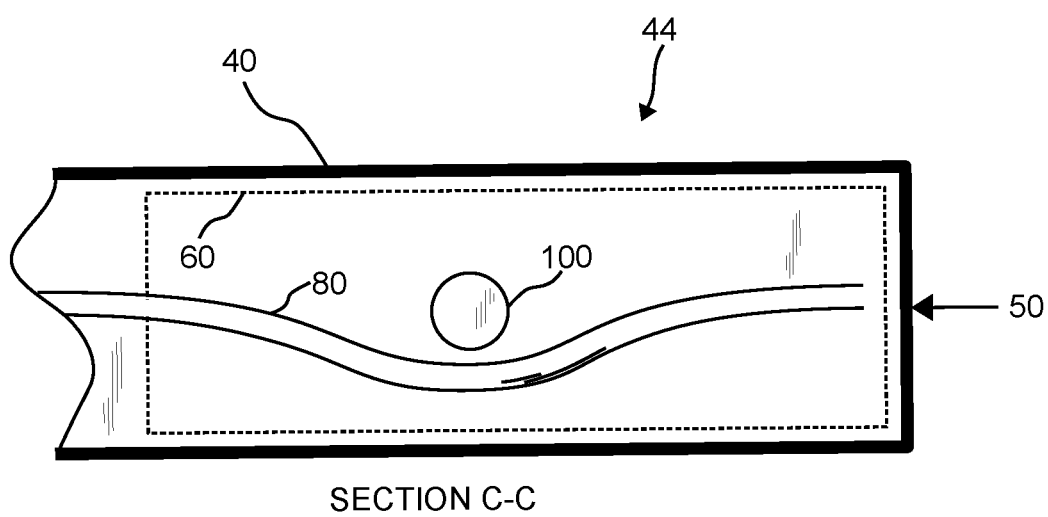
FIG. 9B is a schematic diagram illustrating a cross-section of an exemplary wind turbine blade.

FIG. 9B shows a cross-sectional view "SECTION C-C" indicated in FIG. 9A. FIG. 9B shows a view from the side of one of the shear web parts 40 in the vicinity of the first end 50 of the first blade section 44. As shown, the pin 100 extends through the shear web 40 and through the spar beam 60, which is located between the shear web parts 40. In this view, the spar beam 60 is hidden by shear web part 40 because the spar beam is positioned between the two shear web parts 40.

In FIG. 9B, the pin is shown with a circular cross-section. Other shapes may be used, such as rectangular shapes, such as a square shape, or other suitable shapes providing the required strength.

When using a pin made of metal, a flashover to the pin is, all else being equal, more likely to occur. If this happens, current will travel through electrically more resistive parts such as the shear web and/or the spar beam. Due to their relatively high resistivity, these parts may heat up and are likely to experience structural failure as a result. Thus, as described above, lightning receptors are preferably arranged in the vicinity of the pin in order to provide a conductive path or paths that reduce or even eliminate the risk of flashover to the pin.

Figure 10:
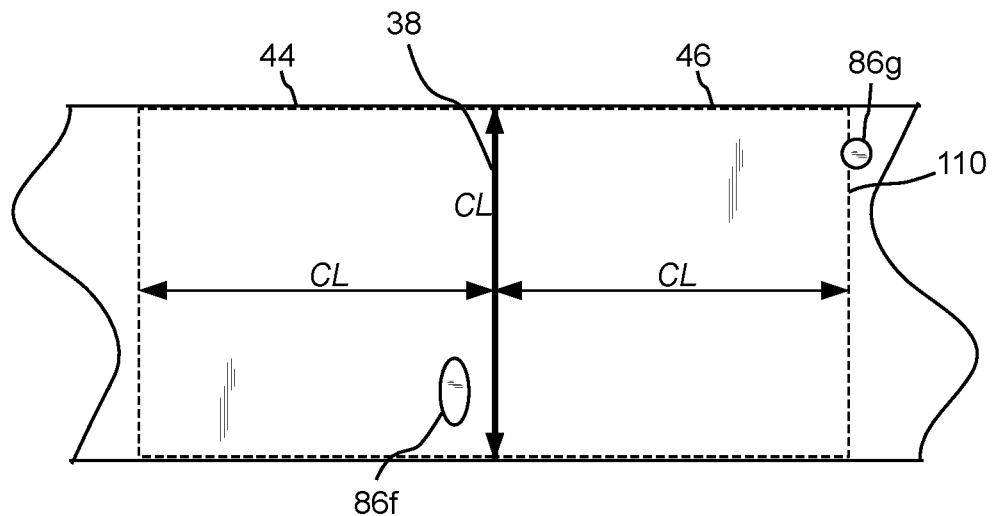
FIG. 10 illustrates schematically receptors in a vicinity of the interface between the first blade section and the second blade section of a wind turbine blade.

FIG. 10 illustrates schematically two receptors 86*f* and 86*g* on a pressure side of a wind turbine blade in a vicinity of the interface between the first blade section and the second blade section. The dashed rectangle illustrates a region 110 that extends to one chord length, CL, to either side of the interface between the first blade section and the second blade section. In some embodiments, it is desirable that a total number of lightning receptors that at least partly overlap or abut this region is low. (A receptor that abuts or overlaps the region 110 also has a smallest distance from the first end of the first blade section equal to or less than the chord length, CL.) A relatively low number of receptors in this region 110 provides a higher structural integrity of the wind turbine blade near the interface between the first blade section and the second blade section. In the example in FIG. 10, there are two receptors overlapping or abutting region 110, namely receptors 86*f* and 86*g*.

Figure 11:
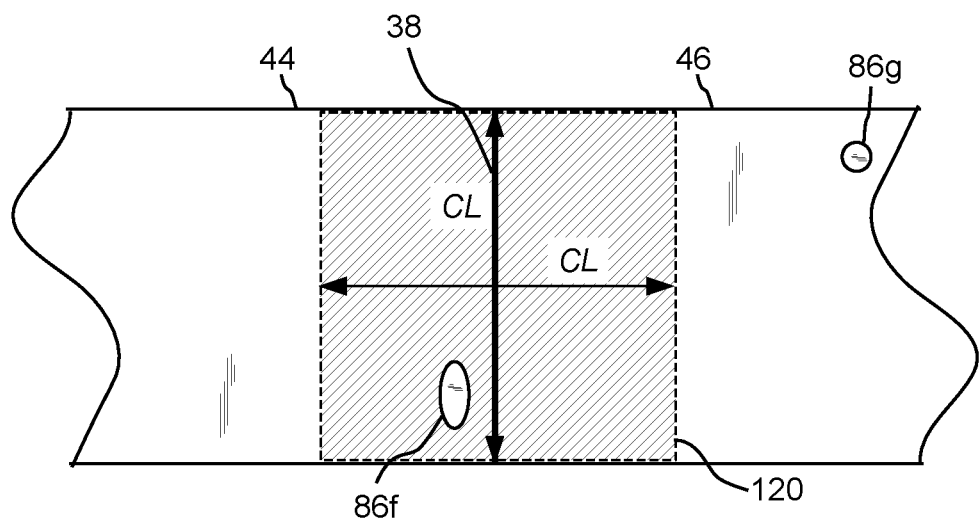
FIG. 11 illustrates schematically an area having a size equal to a chord length squared.

FIG. 11 illustrates schematically an area 120 having a size equal to the chord length CL squared (i.e. $CL^2$). Whatever the number of receptors (1, 2, 3, 4, 5, . . . ) in the region 110 illustrated in FIG. 10, a total area of surfaces of those receptors at or in proximity of the external surface of the wind turbine blade is at most equal to 0.1 times the square of the chord length, i.e. at most 0.1 times the area 120. The total area of the receptors 86*f* and 86*g* is about 2% of the area 120, i.e. about 0.02 times the area 120. Keeping the area of the receptors low ensures a high structural integrity.

The term "receptor" is to be understood as an electrically conductive object being configured with a view to capturing and conducting a lightning current.

Throughout the disclosure, the term "conductive", if not specified otherwise, is to be understood as electrically conductive.

The invention has been described with reference to selected embodiments. However, the scope of the invention is not limited to the illustrated embodiments, and alterations and modifications can be carried out without deviating from the scope of the claims.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
34*a* first airfoil region
34*b* second airfoil region
35*a* external surface of the first airfoil region
35*b* external surface of the second airfoil region
38 chord
40 shear web or spar sides of a spar box
44 first blade section
45 interface between first and second blade sections
46 second blade section
50 first end of first blade section
52 second end of second blade section
60 spar beam
74 first spar cap
76 second spar cap
80 first down conductor
82 second down conductor
86*a*-86*g* lightning receptors
87*a*-87*e* lightning receptor connector elements
96*a*-96*e* lightning receptors
97*a*-97*e* lightning receptor connectors
100 Pin
110 interface vicinity
120 chord squared
CL chord length
L longitudinal axis of wind turbine blade

The invention claimed is:

1. A wind turbine blade (10) extending along a longitudinal axis from a root end (17) to a tip end (15), the wind turbine blade comprising:
a first blade section (44) extending along the longitudinal axis to a first end (50), the first blade section comprising a first airfoil region (34*a*);
a second blade section (46) connected to the first blade section (44), the second blade section (46) extending along the longitudinal axis from a second end (52) towards the tip end (15), and the second blade section comprising a second airfoil region (34*b*);
a first down conductor (80) for conducting lightning current to ground; and
one or more lightning receptors (86*a*-86*e*) at or in proximity of an external surface (35*a*, 35*b*) of the wind turbine blade (10), wherein the one or more lightning receptors do not abut the first end (50) of the first blade section (44), a smallest distance (101) from a first lightning receptor (86*a*) of the one or more lightning receptors to the first end (50) of the first blade section (44) being less than or equal to a chord length of a chord (38) of the wind turbine blade (10) at the first end (50), the first lightning receptor (86*a*) being in electrical connection with the first down conductor (80),
wherein the first blade section (44) is connected to the second blade section (46) by a spar beam (60), and
wherein one of the first blade section (44) and the second blade section (46) comprises a spar beam holding element (40) and the other one of the first blade section (44) and the second blade section (46) comprises the spar beam (60), the spar beam (60) being held in place at the spar beam holding element (40).

2. The wind turbine blade according to claim 1, wherein the smallest distance (101) from the first lightning receptor to the first end of the first blade section is less than a half of the chord length at the first end.

3. The wind turbine blade according to claim 1, wherein the smallest distance (101) from the first lightning receptor to the first end of the first blade section is less than 1 m.

4. The wind turbine blade according to claim 1, wherein the first blade section comprises the first lightning receptor, and the second blade section comprises a second lightning receptor (86b).

5. The wind turbine blade according to claim 4, wherein the second lightning receptor is in electrical connection with the first down conductor or in electrical connection with a second down conductor (82) for conducting lightning current to ground.

6. The wind turbine blade according to claim 4, wherein a smallest distance (102) from the second lightning receptor to the second end of the second blade section is less than or equal to a chord length of a chord of the wind turbine blade at the second end.

7. The wind turbine blade according to claim 4, wherein the smallest distance (101) from the first lightning receptor to the first end of the first blade section is equal to a smallest distance (102) from the second lighting receptor to the second end of the second blade section.

8. The wind turbine blade according to claim 4,
wherein a smallest distance from the first lightning receptor to the second lightning receptor is less than two times the chord length at the first end, and/or
wherein a smallest distance from the first lightning receptor to the second lightning receptor is less than 5 m.

9. The wind turbine blade according to claim 1, wherein the one or more lightning receptors comprises a tip lightning receptor (86c) positioned in the second blade section at or in proximity of the tip end, the tip lightning conductor being in electrical connection with a down conductor for conducting lightning current to ground.

10. The wind turbine blade according to claim 1, wherein the one or more lightning receptors comprises a lightning receptor (86d) positioned between the first lightning receptor and the root end.

11. The wind turbine blade according to claim 1, wherein the spar beam is held in place at the spar beam holding element at least by one or more fastening elements (100), each fastening element rigidly attaching a respective part of the spar beam holding element to a respective part of the spar beam.

12. The wind turbine blade according to claim 11, wherein at least one of the one or more fastening elements is positioned at a longitudinal position, with respect to the longitudinal axis, between a longitudinal position of the first lightning receptor and a longitudinal position of the first end.

13. The wind turbine blade according to claim 1, wherein at least one of the one or more lightning receptors is located at a longitudinal position, with respect to the longitudinal axis, within a longitudinal distance of less than 1 m from a longitudinal position of an end of the spar beam, and/or
wherein a smallest distance from an end of the spar beam to one of the one or more lightning receptors is less than 1 m.

14. The wind turbine blade according to claim 1, wherein the wind turbine blade is a split blade, a two-part blade, or a segmented blade.

15. The wind turbine blade according to claim 1, wherein the one or more lightning receptors are located only in the first blade section or only in the second blade section.

16. The wind turbine blade according to claim 1, wherein said smallest distance from the first lightning receptor to the first end of the first blade section is within 15-75 cm.

17. The wind turbine blade according to claim 1, wherein a total number of lightning receptors having a smallest distance to the first end of the first blade section equal to or less than said chord length is equal to or less than four.

18. The wind turbine blade according to claim 17, wherein a pressure side of the first blade section and the second blade section comprises at most two of said total number of lightning receptors.

19. The wind turbine blade according to claim 17, wherein a suction side of the first blade section and the second blade section comprises at most two of said total number of lightning receptors.

20. The wind turbine blade according to claim 17, wherein a pressure side of the first blade section and the second blade section comprises exactly two of said total number of lightning receptors.

21. The wind turbine blade according to claim 17, wherein a suction side of the first blade section and the second blade section comprises exactly two of said total number of lightning receptors.

22. The wind turbine blade according to claim 17, wherein a pressure side of the first blade section and the second blade section comprises at most one of said total number of lightning receptors.

23. The wind turbine blade according to claim 17, wherein a suction side of the first blade section and the second blade section comprises at most one of said total number of lightning receptors.

24. The wind turbine blade according to claim 1, wherein a total area of surfaces of lightning receptors having a smallest distance to the first end of the first blade section equal to or less than said chord length and being located at or in proximity of the external surface of the wind turbine blade is at most equal to 0.1 times the square of said chord length.

25. The wind turbine blade according to claim 24, wherein said total area of surfaces is at most equal to 0.05 times the square of said chord length.

26. The wind turbine blade according to claim 1, wherein said external surface of the wind turbine blade at an interface between the first blade section and the second blade section is non-metallic.

27. The wind turbine blade according to claim 1, wherein the first blade section comprises a first blade shell having a first shell wall defining a contour of the first blade section, and wherein the second blade section comprises a second blade shell having a second shell wall defining a contour of the second blade section.

28. The wind turbine blade according to claim 27, wherein at least one of the one or more lightning receptors is integrated into the first shell wall or the second shell wall.

29. The wind turbine blade according to claim 27, wherein at least one of the one or more lightning receptors is arranged in a throughgoing opening in the first shell wall or the second shell wall.

30. The wind turbine blade according to claim 27, wherein the one or more lightning receptors is a plurality of lightning receptors, and wherein the first shell wall and/or the second shell wall are configured not to conduct electrical current between at least the first lightning receptor and any of the other lightning receptors of the plurality of lightning receptors.

31. The wind turbine blade according to claim 27, wherein the one or more lightning receptors is a plurality of lightning receptors, and wherein at least the first lightning receptor is not directly electrically connected to any of the other lightning receptors of the plurality of lightning receptors.

32. The wind turbine blade according to claim 27, wherein the one or more lightning receptors is a plurality of lightning receptors, and wherein at least the first lightning receptor is electrically connected to another of the plurality of lightning receptors only via the first down conductor.

33. The wind turbine blade according to claim 27, wherein at least one of the one or more lightning receptors does not participate in maintaining a resilient connection between the first blade section and the second blade section when the wind turbine blade is in operation.

34. The wind turbine blade according to claim 27, wherein none of the one or more lightning receptors participates in maintaining a resilient connection between the first blade section and the second blade section when the wind turbine blade is in operation.

35. The wind turbine blade according to claim 27, wherein the first blade section and the second blade section are connected by a resilient connection provided by connecting means, and wherein at least one of the one or more receptors is separate from the connecting means.

36. A wind turbine blade (10) extending along a longitudinal axis from a root end (17) to a tip end (15), the wind turbine blade comprising:

a first blade section (44) extending along the longitudinal axis to a first end (50), the first blade section comprising a first airfoil region (34a);

a second blade section (46) connected to the first blade section (44), the second blade section (46) extending along the longitudinal axis from a second end (52) towards the tip end (15), and the second blade section comprising a second airfoil region (34b);

a first down conductor (80) for conducting lightning current to ground; and one or more lightning receptors (86a-86e) at or in proximity of an external surface (35a, 35b) of the wind turbine blade (10), a smallest distance (101) from a first lightning receptor (86a) of the one or more lightning receptors to the first end (50) of the first blade section (44) being less than or equal to a chord length of a chord (38) of the wind turbine blade (10) at the first end (50), the first lightning receptor (86a) being in electrical connection with the first down conductor (80), wherein the first blade section (44) and the second blade section (46) are rigidly connected, wherein the one or more lightning receptors (86a-86e) do not abut the first end (50) of the first blade section (44), and wherein the one or more lightning receptors (86a-86e) do not participate in maintaining a resilient connection between the first blade section (44) and the second blade section (46) when the wind turbine blade (10) is in operation.

\* \* \* \* \*